J. STROBEL.
TEMPER SCREW.
APPLICATION FILED JULY 8, 1920.
1,417,698.
Patented May 30, 1922.
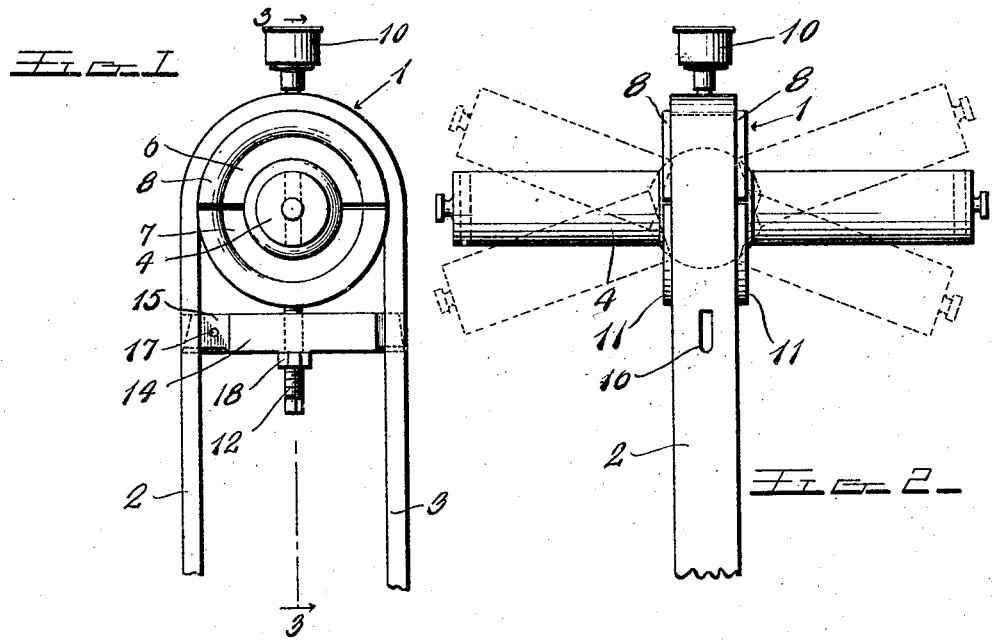
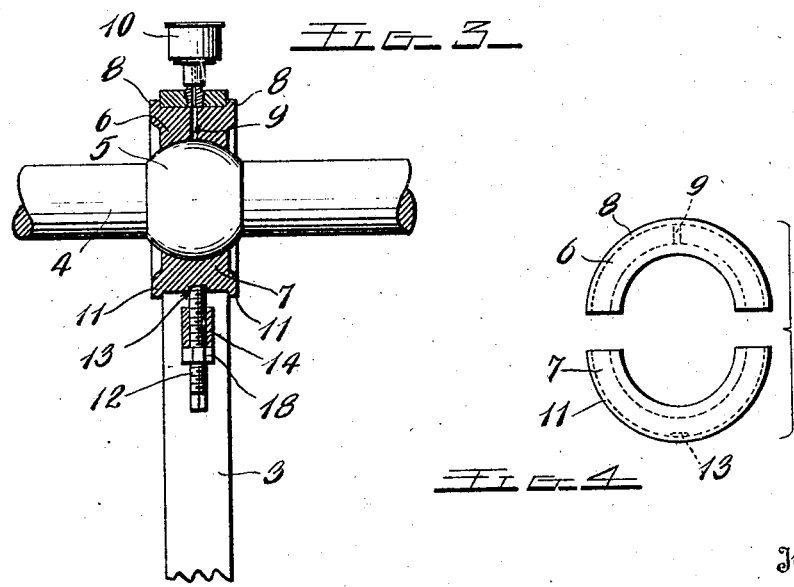
Inventor
Joseph Strobel
By Townshend + Townshend
Attorneys

UNITED STATES PATENT OFFICE.

JOSEPH STROBEL, OF TULSA, OKLAHOMA.

TEMPER SCREW.

1,417,698.   Specification of Letters Patent.   Patented May 30, 1922.

Application filed July 8, 1920. Serial No. 394,747.

*To all whom it may concern:*

Be it known that I, JOSEPH STROBEL, a citizen of the United States, residing at Tulsa, in the county of Tulsa and State of Oklahoma, have invented certain new and useful Improvements in Temper Screws, of which the following is a specification.

My invention relates to temper screws used in the drilling of wells for oil and gas and more particularly to an improved construction of the reins and cross bar employed.

At the present time, the type of temper screw used in well drilling, employs reins which merge at the top into an integral cross bar or T head, adapted to engage in bearings on the usual walking beam. Due to improper alignment of the walking beam forks from wear and various other causes, the T bar is angled causing side whipping of the temper screw and drilling instruments, furthermore due to friction in the bearings, the temper screw is caused to whip backward and forward, so that it is impossible to maintain the temper screw at a direct perpendicular, thereby resulting in considerable wear and tear on the screw and necessitating frequent changes and renewals of parts employed.

It is the primary object of my invention to provide a temper screw in which side whipping of the screw is entirely eliminated and forward and backward whipping reduced to a minimum and which is maintained at all times in a direct perpendicular.

Another object is to provide a bearing for the temper screw, whereby friction is reduced and free movement permitted the screw at all times.

A further object is the provision of a temper screw constructed of a single metal strap.

Additional objects include the provision of adjusting means for the bearing, lubricating means, and an improved construction simple in nature, economical in operation and cheap to manufacture, requiring less attention on the part of an attendant, and which is more efficient than any in use at the present time.

With these general objects in view, and such others as will be apparent from the description, my invention resides in the novel construction, combination, and arrangement of parts hereinafter described and claimed and illustrated in the accompanying drawings forming a part of the specification, in which;

Fig. 1, is a side elevation of the upper portion of my improved temper screw and bearing, Fig. 2, an elevation at right angles to Fig. 1, Fig. 3, a vertical section taken substantially on the line 3—3 of Fig. 1, and Fig. 4, a detail plan of the bearing employed.

In this preferred embodiment of the invention, my improved temper screw comprises an inverted U shaped metal strap 1, the arms of which comprise the reins 2 and 3, upon the lower ends of which is disposed suitable means for mounting of the drilling tools and mechanism (not shown).

Positioned transversely in the bend of the strap at the upper end of the temper screw, is a cross bar 4, provided with an enlarged ball shaped middle portion 5 mounted in a socket composed of a pair of brasses 6 and 7, the upper brass 6 being provided with lateral flanges 8 to engage over the sides of the strap 1 to prevent lateral displacement, and having in its uppermost portion a bore 9 in alignment with the nozzle of an oil or grease cup 10 threaded in a bore at the uppermost portion of the strap.

The lower brass 7 is provided with similar lateral flanges 11 and is locked in position by means of a screw 12, engaged in a socket 13 formed in the bottom of the brass and carried in a retaining bar 14 of substantially rectangular cross section, provided with reduced end portions 15 having rounded bottoms and engaged in sockets 16, comprising longitudinally aligned slots in the reins 2 and 3.

One of the end portions 15 is reduced in greater length than the other to provide for insertion of the bar, and is provided with a bore 17 for the reception of a locking pin (not shown) to prevent longitudinal displacement of the bar.

The lower brass 7 is adjusted to compensate for wear, by means of the screw 12. A nut 18 is provided for locking screw 12. The outer ends of the cross bar 4 are adapted to be positioned in the usual bearings of the walking beam.

The ball bearing 5 is of relatively large dimensions and extends laterally beyond the sides of the brasses 6 and 7 which are semi-circular in shape to engage in the bend of the strap 1. This construction of bearing 5, provides increased bearing surface, permitting the cross bar 4 to be angled relative to the strap 1 as indicated in Fig. 2, whereby the temper screw will hang perpendicularly at all times when the cross bar 4 is mounted in a walking beam.

Adjusting screw 12 is located centrally of the bar 14 and owing to the construction of the sockets 16 and end portions 15 of the bar, tightening of screw 12, not only serves to adjust brass 7 but forces a tight engagement of the ends of the bar and the sockets, preventing any possibility of accidental disengagement of the parts through jarring.

It will be seen that bearing 5, brasses 6 and 7 and the retaining means therefor, comprise a ball and socket joint, making in effect a swivel bearing at the top of the temper screw strap 1. The parts are readily assembled or dismounted by removal of the retaining bar 14, for the renewal of brasses from time to time.

It will be seen that my invention is a great improvement over the present forms of temper screws, inasmuch as with those now employed the T bars frequently break due to frictional strain in the walking beam bearings, necessitating the mounting of a complete new temper screw. This is entirely eliminated in my invention, as the T bar is made separate from the reins and is disposed in a loose bearing at the top of the reins, thereby avoiding excess frictional strain on all parts.

While I have shown and described certain specific details and materials entering into the construction and operation of this embodiment of my invention, I desire it to be understood that I do not limit myself to these, but that changes may be made in the details without departing from the invention as claimed.

I claim:—

1. The combination with a temper screw, of a split bearing removably carried therein, the opposed faces of said bearing being curved to form an annular socket, a cross bar adapted for engagement with a walking beam, and a ball formed on said bar engageable with the annular socket of the bearing to form a universal swivel connection between said parts.

2. In a temper screw a pair of reins formed of a single metal strap of inverted U shaped construction, a split bearing removably mounted in the bend thereof, a cross bar universally swivelled in said bearing, a bearing supporting bar removably mounted between said reins, and means carried by the strap and communicating with the swivel bearing for lubricating the same.

3. In a temper screw a pair of reins formed of a single strap of inverted U shape, said reins having aligned sockets therein, below the bend of the U, a bar between said reins extending through and supported in the sockets, a bearing in the bend of the strap, and supported on said bar, means on said bearing for engagement with said strap, and a cross bar in said bearing adapted for mounting in a walking beam.

4. In a temper screw a pair of reins formed of a single metal strap of inverted U shape formation, a split bearing in the bend thereof, lateral flanges on said bearing engaged over said strap to prevent lateral displacement of the bearing, a cross bar disposed in said bearing and adapted to be journalled in a walking beam, said reins having aligned slots therein below the bearing, a retaining bar for the bearing mounted in said slots and extending beneath the bearing and through said slots, an adjusting screw carried in said retaining bar beneath the lowermost portion of the bearing and adapted to engage thereagainst for adjustment thereof, and means to lock said bearing and retaining bar in position.

In testimony whereof I affix my signature.

JOSEPH STROBEL.